Dec. 9, 1930.  L. J. CAMPBELL  1,784,088
POWER TAKE-OFF UNIT FOR TRACTORS
Filed Oct. 4, 1926  3 Sheets-Sheet 2
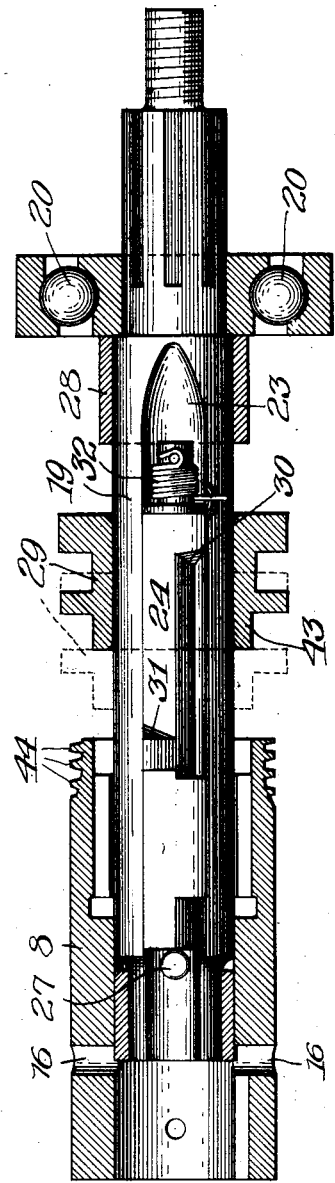
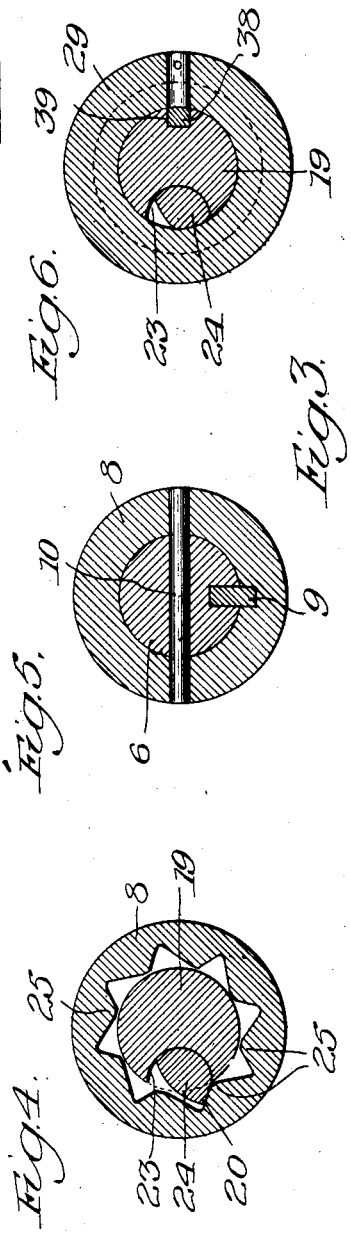
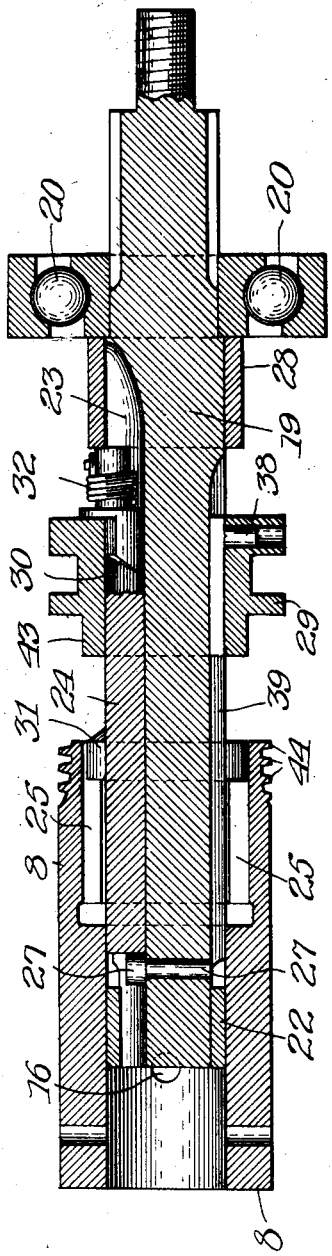
Inventor,
Leon J. Campbell,

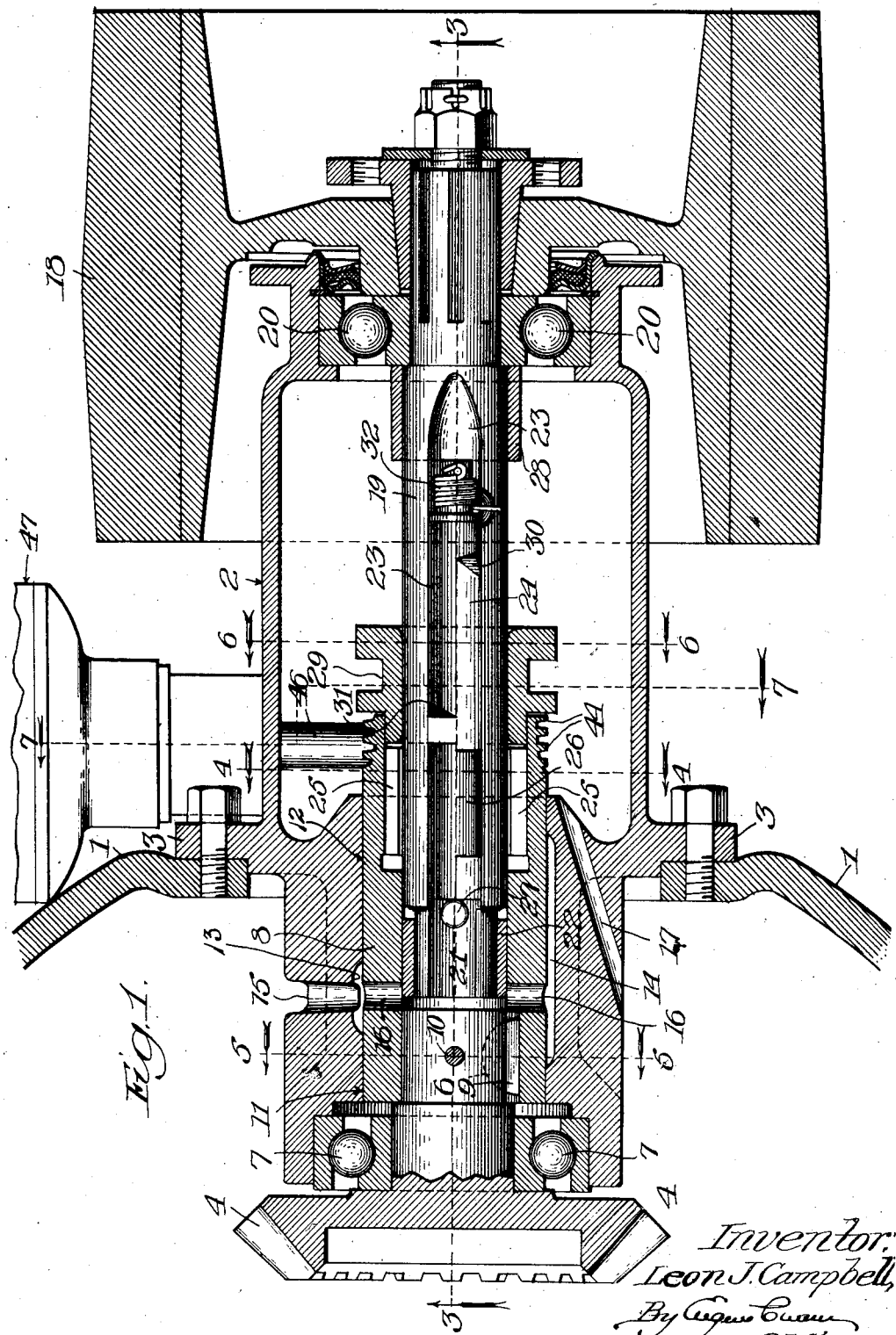

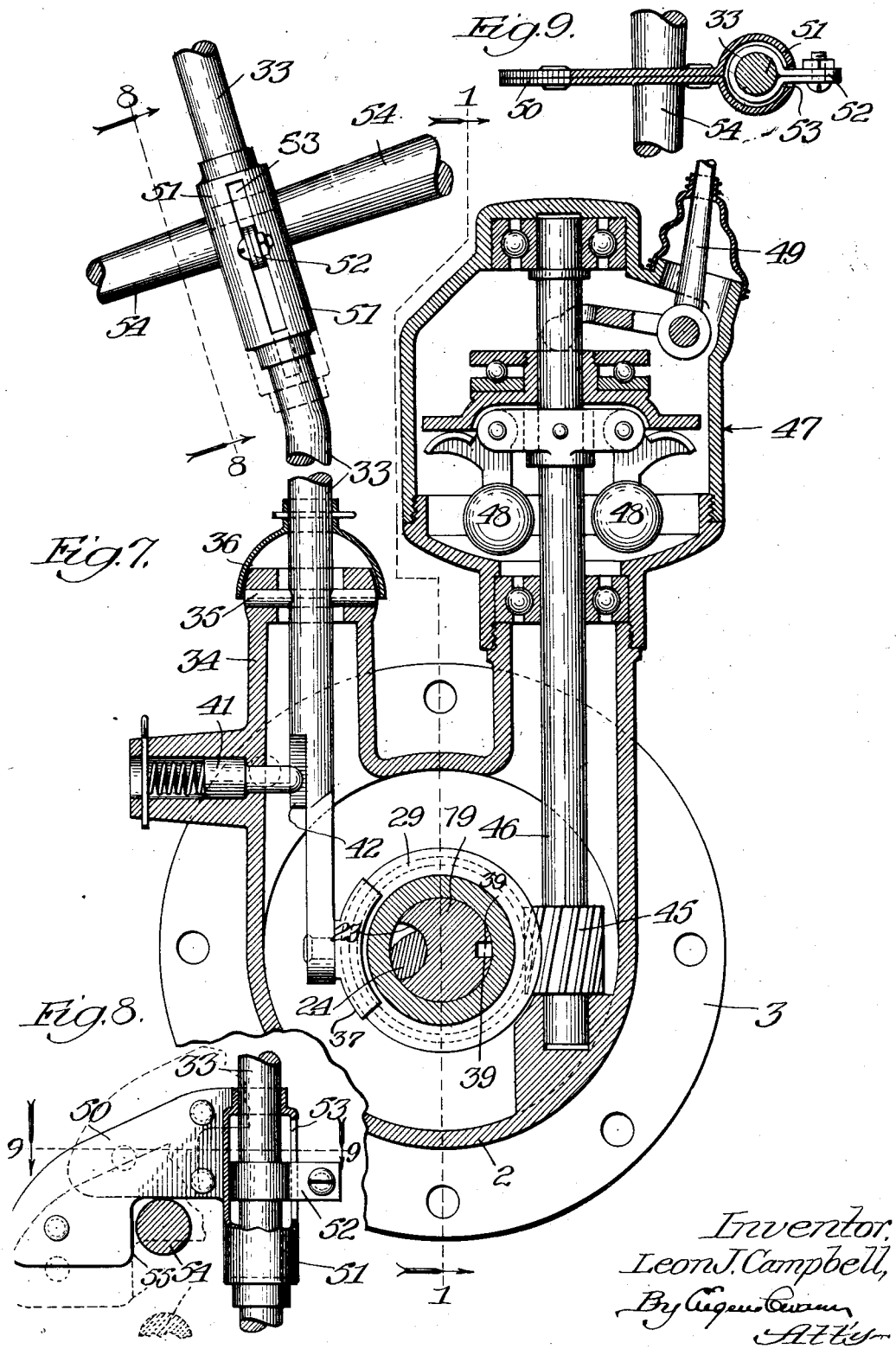

Patented Dec. 9, 1930

1,784,088

UNITED STATES PATENT OFFICE

LEON JAY CAMPBELL, OF BUCHANAN, MICHIGAN, ASSIGNOR, BY MESNE ASSIGNMENTS, TO THE STUDEBAKER CORPORATION, OF SOUTH BEND, INDIANA, A CORPORATION OF NEW JERSEY

POWER TAKE-OFF UNIT FOR TRACTORS

Application filed October 4, 1926. Serial No. 139,250.

This invention relates to power take-offs for tractors, and more particularly for Fordson tractors, so that the tractor may be provided with a belt pulley or other power delivery member by means of which stationary or other machinery may be operated by the tractor engine.

In power take-offs as heretofore made and used, the clutch of the unit can not be released while the unit is under load without first disengaging the clutch of the tractor, due to the fact that the clutch mechanism of the unit when under load strains is not releasable. Consequently, considerable delay is caused in releasing the clutch, which delay might be very serious in the case of accidents to the operator or to the machine driven by the tractor. Moreover, in these units, the clutch mechanism can not be operated independently of the main clutch of the tractor, thus requiring that they be worked together, due to the fact that they can not be engaged or disengaged without a corresponding operation of the tractor clutch, thus making the device inconvenient to operate with many operations and many operators. Then again, in these units, the driving and driven shafts are supported only at the ends of the unit with the result that the meeting or adjacent ends of these shafts are unsupported and readily get out of alignment on the application of power or undue strains thereon. This places unnecessary wear and strains on the bearings and gears and causes the shafts to weave, thereby giving the belt operating on the belt pulley a wabbling or whipping action, with resultant loss of power and undue wear on the bearings of both the unit and the machinery driven thereby.

The object of my invention is to provide a power take-off unit which overcomes the objections heretofore noted and also to provide a type of clutch for the unit which may be operated independently of the clutch of the tractor whenever desired, thereby allowing the unit to be readily released from the power element of the tractor without being required to disengage the tractor clutch. This allows the unit to be disengaged from the tractor the instant desired, thereby making the device much safer than as heretofore constructed and much more flexible, in that the power may be cut off instantly by releasing the clutch in the unit, which is an especial advantage when it is considered that devices of this character are operated by unmechanical and inexperienced users.

Another object of my invention is to provide such a support for the driving and driven shafts within the casing of the unit as to maintain such shafts in correct axial alignment at all times and thus prevent any undue strains on the bearings and gears, as well as keeping the belt in proper running position.

A further object of my invention is to have the speed controlling governor for the tractor engine combined with and driven by the power take-off unit so that these two fixtures may be combined in one for convenience of installation and use, as well as making the power take-off attachment serve more than one purpose.

The invention consists further in the matters hereinafter described and claimed.

In the accompanying drawings—

Fig. 1 is a longitudinal vertical sectional view taken through a power take-off unit constructed in accordance with my invention;

Fig. 2 is an elevational view of the driving and driven shaft assembly with parts in section;

Fig. 3 is a longitudinal vertical sectional view through said shaft assembly on line 3—3 of Fig. 1;

Figs. 4, 5, and 6 are transverse vertical sectional views taken on lines 4—4, 5—5, and 6—6, respectively, of Fig. 1;

Fig. 7 is a vertical sectional view taken on line 7—7 of Fig. 1, and showing the shift lever and governor of the unit;

Fig. 8 is a plan section taken on line 8—8 of Fig. 7; and

Fig. 9 is a horizontal sectional view taken on line 9—9 of Fig. 8.

In the drawings, 1 indicates the tractor housing having an opening through which the inner end of the casing 2 of my improved unit is inserted, as shown in Fig. 1. This casing has a surrounding flange 3, so that it may be secured to the tractor housing, with the casing 2 extending outward therefrom, as shown. Said casing 2 is preferably in the form of a one-piece casting and has a length to extend from end to end of the unit.

At the inner end of the casing 2, that is, the end within the tractor housing 1, there is a beveled gear 4, which meshes with a beveled gear (not shown) of the tractor transmission. The hub of the gear 4 is made in the form of a stub shaft 6, which extends into the adjacent end of the casing 2. An anti-friction bearing 7 is mounted in the inner end of the casing 2 to support the shaft 6, as shown. The inner end of the shaft 6 extends into a sleeve 8 journaled in the casing 2, the shaft 6 being fixed to the sleeve by a key 9 and a pin 10, the latter holding the parts against endwise displacement. (See Figs. 1 and 5.)

The casing 2 is provided with a bore to receive and support the sleeve 8. This bore extends along the length of the sleeve and provides a relatively wide bearing surface therefor. This surface in total is wide enough to properly support the sleeve and maintain it in correct axial alignment with the gear 4 and the driven shaft, to be presently described, and also to provide sufficient metal in the bearing to carry off all heat likely to be produced during the rotation of the sleeve. By making this bearing wide enough, there is no improper wearing of the teeth of the bevel gears thus prolonging the life of the unit and making a quiet running mechanism.

The bearing surfaces mentioned are marked 11, 12 in the drawings, and these are separated by an annular oil groove 13 made in the bore and surrounding the sleeve. This groove communicates with an oil well 14 formed as a longitudinal groove in the lower portion of the bore along the under side of the sleeve 8, as shown in Fig. 1. The casing 2 has an inlet opening 15 on its upper side for feeding lubricant from the tractor housing to the groove and well 13, 14, respectively. The sleeve 8 has oil holes 16 in register with the groove 13, so that oil may flow into the interior of the sleeve. The casing 2 has an oil outlet passage 17 in its under side so as to return oil from the interior of the casing 2 to the supply in the tractor housing 1.

A belt pulley 18 or other power delivery member is located at the outer end of the casing 2. This pulley is fixed to the outer end of a driven shaft 19 in any suitable manner so as to be rotated thereby. The shaft 19 extends into the casing 2 through an antifriction bearing 20 mounted in the outer end of the casing, as shown. The shaft 19 extends into the sleeve 8 and terminates just short of the portion of the shaft 6 within the sleeve, as shown in Fig. 1. At such point the shaft 19 is reduced, as at 21, and is supported in the sleeve 8 by a relatively wide bronze bushing 22, which is fitted in the sleeve, as shown.

The shaft 19 is provided with a concave groove or key seat 23 extending lengthwise thereof and in that portion extending inside and outside of the sleeve 8, respectively. Rockably mounted in this groove is a key 24 extending substantialy the full length of the groove or key seat, as shown in Figs. 1, 2, and 3. The key 24 thus has a portion within and outside the sleeve, respectively. The end of the sleeve 8 where the shaft 19 extends into it is provided with a plurality of internal projections 25, as clearly shown in Fig. 4. The key 24 is provided with a locking lug 26 adapted in the rocking of the key to be turned into and out of clutched engagement with the projections 25. (See Fig. 4.)

When the key is rocked axially in one direction, the lug 26 is disengaged from the projections 25 so as to disconnect the sleeve 8 from the shaft 19 and thus permit the gear 4 to be rotated by the tractor engine without imparting power to the pulley 18. When the key is rocked in the opposite direction, the lug 26 is extended up into the space between two of the projections 25 and locks or clutches the sleeve 8 to the shaft 19 so that power may be transmitted from the tractor engine to the pulley 18. The key 24 is held against endwise movement by a pin 27 and a collar 28 at the opposite ends of the key. The pin 27 is driven into the shaft 19 at the front of the key, while the collar 28 has a tight fit on the shaft at the rear end of the key, as shown in Figs. 1, 2, and 3. The pin 27 is located in the key groove 23 so as to be within the bushing 22, as clearly shown in Fig. 3.

To rock the key, a shift collar 29 is slidably mounted on the portion of the shaft 19 outside of the sleeve 8. The key 24 has a pair of cam projections 30, 31 arranged on opposite sides of its longitudinal axis and on opposite sides of the collar 29 so that the collar on being slid endwise on the shaft will rock the key by riding over these projections. When the collar 29 slides over the projection 30, the key is rocked to disconnect the sleeve 8 from the shaft 19 (see Fig. 3); whereas, when the collar is slid over the other projection 31, the key is rocked to connect the sleeve 8 with the shaft 19. (See Fig. 1.)

A spring 32 is coiled about the rear end of the key 24 and has one end connected with the key and the other end bearing against the shaft 19. This spring constantly tends to rock the key in a direction to turn its lug 26 into locking or clutching position. The collar 29 has a width less than the distance between the projections 30, 31, so that said collar may be free of both projections when in a position between them, as shown in dotted lines in Fig. 2. Thus the spring 32 may act to rock the key into clutched engagement with the sleeve 8 after the collar frees the projection 30, but before it acts on the projection 31. Should the spring break or fail to properly rock the key, the operation will be positively effected on shifting the collar 29 over the projection 31. The outer contour of the key adjacent each cam projection conforms to the curvature of the bore of the collar so that the key is held from rocking while the collar is over either projection, as shown in Fig. 6.

To slide the shift collar 29 on the shaft 19, I provide a shift lever 33 extending up out of the top of the casing 2 through a suitable housing 34 thereon, as shown in Fig. 7. This lever is fulcrumed in the housing 34 by a horizontally disposed pin 35. The lever carries a dust cap 36 fitting over the upper end of the housing, as shown. The lower end of the lever 33 extends down into the casing to one side of the shift collar 29 and there carries a shoe 37 fitting in the annular groove in the outer periphery of the collar so that the latter may be slid back and forth by said lever. The shift collar 29 is keyed to the shaft 19 so as to rotate therewith and thus prevent burning the cam faces of the projections 30, 31. This connection comprises a pin 38 carried by the collar 29 and extending into an elongated slot 39 in the shaft 19, as shown in Fig. 3. A spring pressed check 41 (see Fig. 7) is carried by the housing 34 at one side of the lever 33, and is designed to bear against the lever on either side of a V-shaped projection 42 so as to hold the lever in either of its shifted positions.

The sleeve 8 in being keyed or fixed to the stub shaft 6 of the gear 4, constitutes in effect the driving shaft of the unit. By providing a relatively wide bearing (11—12) for this shaft in the casing 2 and having the driven shaft 19 supported in the sleeve by a relatively wide bushing 22, the driving and driven shafts are supported in correct axial alignment at all times so that there is no opportunity afforded for these shafts to run eccentric and cause undue wear on the bearings or the teeth of the bevel gears, or throw the pulley 18 out of proper running position. The shift collar 29 is provided on its side toward the sleeve 8 with an annular projection 43 of a diameter to enter the sleeve when the collar is shifted into driving position, as shown in Fig. 1. This projection 43 fits within the sleeve where it extends into the same and serves to maintain the sleeve and driven shaft 19 in axial alignment. The sleeve 8 is recessed to accommodate the projection 43.

With the key type of clutch as shown and described, the driving and driven shafts 8 and 19 of the unit may be readily and easily disconnected without the necessity of first disengaging the clutch of the tractor, as heretofore, for the reason that the clutch key 24 is rolled down out of engagement with the sleeve 8 regardless of the load strains on the shafts or their speed of rotation. Thus, the clutch key 24 may be operated whenever desired, independently of the tractor clutch, with the result that the machine or other device driven by the tractor may be quickly and easily disconnected therefrom without the delay incident to mounting the tractor and throwing out the tractor clutch, as heretofore. This is an important feature of my invention, because it provides a safety factor in case of accident either to the machine driven by the tractor or to the operator attending the same, as the machine may be quickly disconnected from the tractor by simply releasing the clutch of the unit.

As shown in Fig. 1, the inner end of the sleeve 8 extends inward beyond the portion of the casing 2 in which the sleeve is journaled. Said sleeve has spiral teeth 44 about its inner end, and a spiral pinion 45 meshes therewith. This pinion is fixed on a shaft 46, which is journaled in the casing 2 at one side of the sleeve, as shown in Fig. 7. This shaft extends to a speed governor mechanism 47, which is carried by the casing 2. This mechanism includes a set of centrifugal weights 48, which operate a crank 49 for automatically controlling the supply of fuel mixture to the tractor engine in accordance with the required speed thereof. With the governor mechanism geared to the driving sleeve 8 of the unit, said mechanism may be used whether the pulley 18 is in or out of service. Thus, the governor device may serve to control the fuel mixture of the tractor motor at all times. With the governor mechanism combined with the power take-off unit, as shown and described, the governor may have a geared connection with the motor speeds and thus be directly driven without chance of slippage, as when belts are used as heretofore. Moreover, this combination reduces the assembly to a single fixture, thus insuring alignment, proper lubrication, rigidity, and compactness of construction, as well as economy in manufacture.

In order to lock the shift lever 33 from being accidentally moved into clutch engaging position, I may use with the lever a latch member 50. This member has a tubular body 51 to slide on the lever 33, and is located above the dust cap 36. The lever 33 carries a stop 52 projecting outward therefrom through an elongated slot 53 in the tubular body 51 to limit the sliding of the latch up and down the lever 33, the latter extending vertically. This lever crosses in front of the operating lever 54 of the tractor clutch, and the latch member 50 has a notch 55 in its under side to accommodate the tractor lever, as shown in Fig. 8. When the shift lever 33 is in clutch released position, the levers 33 and 54 are nearest each other, with the former held in the notch 55 by the spring of the tractor clutch. At this time the latch holds the lever 33 from being accidentally moved into clutch engaging position. When the latch is used, it is necessary to first depress the lever 54 to release the clutch of the tractor. This carries the lever 54 downward, the latch 51 following until stopped by the stop 52, whereupon the downward movement of the lever 54 is continued to the full release position of the tractor clutch, said lever 54 at this time being completely out of the notch 55. The lever 33 may then be shifted outward from the lever 54 to effect the engagement of the clutch of the unit. In so shifting the lever 33, the notch 55 is carried out of the path of the lever 54, whereupon the latter raises the latch on moving upward to engage the tractor clutch. The latch now rests on the upper side of the lever 54, and is in position to drop over the same on moving the shift lever 33 back into its clutch release position for locking the shift lever to the tractor lever.

The stop 52 is preferably made in the form of a band clamped about the lever 33 so that the stop may be adjusted up or down said lever to properly position it thereon with respect to the extent of movement had by the tractor lever 54. Moreover, in being adjustable the stop may be changed to take up for wear in the tractor clutch or of the lever 54.

The details of construction shown and described may be variously changed and modified without departing from the spirit and scope of my invention.

I claim as my invention:

1. The combination with a power driven tractor having a clutch and an operating lever therefor, of a power take-off unit having an outer casing attached to the tractor, driving and driven shafts journaled in the casing, clutch means within the casing for said shafts, a shift lever for said clutch means and extending out of the casing across the tractor lever, and latch means associated with both levers for locking the same together on moving the shift lever into its clutch-release position.

2. The combination with a power driven tractor having a clutch and a horizontally disposed operating lever therefor, of a power take-off unit having an outer casing attached to the tractor, driving and driven shafts journaled in the casing, clutch means within the casing for said shafts, a shift lever for the clutch means and extending upward out of the casing across the tractor lever, and a latch member slidably carried by the shift lever above the tractor lever and having a hook shaped lower portion to rest on the tractor lever and drop over the same on moving the shift lever into its clutch release position.

3. A power take-off unit having an outer casing adapted for attachment to a tractor, said casing having a tubular portion at one end, a sleeve journaled in and supported by said tubular portion, a gear wheel fixed to said sleeve for rotating the same, a shaft journaled in the other end of the casing and extending into the same, said shaft being in axial alignment with said sleeve and having its inner end extending into and supported by said sleeve, a belt pulley fixed to said shaft, said tubular portion being in direct contact with and extending along the sleeve for the greater portion of its length to provide a relatively wide bearing surface therefor, and a shiftable clutch mechanism in the casing for connecting the shaft to and disconnecting it from said sleeve.

In testimony whereof I affix my signature this 30th day of September, 1926.

LEON JAY CAMPBELL.